United States Patent
Rollet

(10) Patent No.: US 11,785,043 B2
(45) Date of Patent: Oct. 10, 2023

(54) COMPUTATIONAL PUZZLES AGAINST DOS ATTACKS

(71) Applicant: MITSUBISHI ELECTRIC CORPORATION, Tokyo (JP)

(72) Inventor: Romain Rollet, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 192 days.

(21) Appl. No.: 17/427,724

(22) PCT Filed: Jan. 30, 2020

(86) PCT No.: PCT/JP2020/004445
§ 371 (c)(1),
(2) Date: Aug. 2, 2021

(87) PCT Pub. No.: WO2020/202780
PCT Pub. Date: Oct. 8, 2020

(65) Prior Publication Data
US 2022/0116418 A1  Apr. 14, 2022

(30) Foreign Application Priority Data
Mar. 29, 2019  (EP) ..................... 19305427

(51) Int. Cl.
*H04L 9/40* (2022.01)
*H04L 9/06* (2006.01)
(52) U.S. Cl.
CPC ........ *H04L 63/1458* (2013.01); *H04L 9/0643* (2013.01); *H04L 2463/141* (2013.01)

(58) Field of Classification Search
CPC ............... H04L 63/1458; H04L 9/0643; H04L 2463/141
See application file for complete search history.

(56) References Cited

U.S. PATENT DOCUMENTS

2007/0157300 A1 * 7/2007 Sivaradjane ........ H04L 63/1458 726/9
2010/0031315 A1 * 2/2010 Feng ................... H04L 63/1458 709/229

(Continued)

FOREIGN PATENT DOCUMENTS

| CN | 102017578 A | 4/2011 |
|---|---|---|
| CN | 106850603 A | 6/2017 |

(Continued)

OTHER PUBLICATIONS

Office Action dated Nov. 2, 2022 in counterpart Chinese Applicatioin No. 202080024045.6 with an English Translation.

(Continued)

*Primary Examiner* — Stephen T Gundry
(74) *Attorney, Agent, or Firm* — Birch, Stewart, Kolasch & Birch, LLP

(57) ABSTRACT

A method for transmitting data in a computer network is provided, which comprises, at a first node of the network: receiving a computing puzzle from a puzzle server node of the network distinct from the first node; determining a solution to the puzzle for transmitting a message to a second node of the network distinct from the puzzle server node; and transmitting data to the second node, wherein the transmitted data comprises a message and the determined solution to the puzzle.

15 Claims, 8 Drawing Sheets

(56) References Cited

U.S. PATENT DOCUMENTS

| | | | | |
|---|---|---|---|---|
| 2011/0116381 | A1* | 5/2011 | Nikander | H04L 67/564 |
| | | | | 370/236 |
| 2014/0365775 | A1* | 12/2014 | Yavuz | H04L 9/3297 |
| | | | | 713/171 |
| 2017/0244709 | A1* | 8/2017 | Jhingran | G06F 21/44 |
| 2018/0092025 | A1 | 3/2018 | Selander et al. | |
| 2018/0131679 | A1* | 5/2018 | Selander | H04L 63/1458 |
| 2019/0197130 | A1* | 6/2019 | Huang | H04L 9/50 |
| 2019/0245690 | A1* | 8/2019 | Shah | H04J 3/0667 |
| 2020/0127860 | A1* | 4/2020 | Aschauer | H04L 9/3236 |
| 2020/0210584 | A1* | 7/2020 | Ficarra | G06F 21/54 |
| 2021/0166221 | A1* | 6/2021 | Noh | G06Q 20/3223 |
| 2021/0258169 | A1* | 8/2021 | Basu | H04L 9/0894 |
| 2021/0279736 | A1* | 9/2021 | Sun | H04L 9/50 |
| 2022/0027352 | A1* | 1/2022 | Teodor | G16B 50/30 |
| 2022/0029813 | A1* | 1/2022 | Wakabayashi | H04L 9/3247 |
| 2022/0038259 | A1* | 2/2022 | Fazzone | H04L 9/50 |
| 2022/0070006 | A1* | 3/2022 | Jetzfellner | H04L 9/3236 |
| 2022/0103369 | A1* | 3/2022 | Adams | H04L 9/3234 |
| 2022/0116418 | A1* | 4/2022 | Rollet | H04L 9/0643 |
| 2022/0138741 | A1* | 5/2022 | Alt | G06Q 20/3829 |
| | | | | 705/71 |
| 2022/0148111 | A1* | 5/2022 | Wright | H04N 7/147 |
| 2022/0173893 | A1* | 6/2022 | Basu | H04L 9/3255 |
| 2022/0174077 | A1* | 6/2022 | Sel | H04L 63/1408 |
| 2023/0039746 | A1* | 2/2023 | Magerkurth | G06Q 20/3825 |

FOREIGN PATENT DOCUMENTS

| | | |
|---|---|---|
| JP | 2018-11370 A | 1/2018 |
| WO | WO 2014/144555 A1 | 9/2014 |

OTHER PUBLICATIONS

Japanese Office Action for corresponding Japanese Application No. 2021-562440, dated Jul. 12, 2022, with English translation.

Waters et al., "New Client Puzzle Outsourcing Techniques for DoS Resistance", XP-002538930, 2004, pp. 1-11.

Korean Office Action dated Feb. 24, 2023 in counterpart Korean Application No. 10-2021-7029537 with an English Translation.

\* cited by examiner

COMPUTATIONAL PUZZLES AGAINST DOS ATTACKS

TECHNICAL FIELD

The present disclosure relates to the field of data communication in a communication network, in particular in an industrial network such as an industrial bus network (e.g. an OPC-UA network).

BACKGROUND ART

Data communication mechanisms in computer networks such as industrial field-bus networks typically allow for transmitting and/or receiving data between two nodes of the network, including time critical distributed control data, according to data communication protocols which are often proprietary and specifically configured for a target use case.

Over the recent years industrial networks, which were traditionally closed networks, have evolved to include nodes, such as management nodes or inter-network communication nodes that are connected to public networks, such as the Internet. For example, an operation and management (O&M) node implemented as a personal computer platform running a PC operating system connected to the Internet may be connected to a previously closed network for managing the operations of the network. As another example, such a personal computer platform running a PC operating system connected to the Internet may be used to control closed industrial networks setup on geographically different sites.

Industrial networks including nodes connected to a non-secured computer may therefore become the target of computer attacks through their nodes connected to public networks, such as Denial of Service (DoS) attacks. A DoS or depletion attack is an attack in which the attacker sends a high number of requests to a specific device (for instance a server), exhausting its resources which leads to render it incapable of servicing some legitimate requests.

DoS attacks in critical systems may have a larger impact because they may lead very quickly to a delayed processing of legitimate request. For instance, industrial field-bus systems used for real-time distributed control are time critical, as each received message shall be processed in a bounded time to guaranty the good working of the industrial process. The processing induced by the reception of a set of unexpected messages may delay the processing of critical messages, leading to a malfunction of the global processing or significantly deteriorated performances. Furthermore, industrial computer networks may be very sensitive to. DoS attacks as they typically include devices that are very often based on hardware with limited computational resource (because of the environment in which the devices are deployed, product lifetime and cost).

There is therefore a need for providing improved data communication schemes and network node implementing the same that address at least some of the above-described drawbacks and shortcomings of the conventional technology in the art.

It is an object of the present subject disclosure to provide improved data communication schemes and apparatuses implementing the same.

Another object of the present subject disclosure is to provide an improved data transmission scheme in a computer network and apparatus implementing the same for alleviating the above-described drawbacks and shortcomings of conventional schemes, in particular in a computer network configured for performing time critical data communication among nodes.

Yet another object of the present subject disclosure is to provide an improved data reception scheme in a computer network and apparatus implementing the same for alleviating the above-described drawbacks and shortcomings of conventional schemes, in particular in a computer network configured for performing time critical data communication among nodes.

To achieve these objects and other advantages and in accordance with the purpose of the present subject disclosure, as embodied and broadly described herein, in one aspect of the present subject disclosure, a method for transmitting data in a computer network is proposed. The method comprises, at a first node of the network: receiving a computing puzzle from a puzzle server node of the network distinct from the first node; determining a solution to the puzzle for transmitting a message to a second node of the network distinct from the puzzle server node; and transmitting data to the second node, wherein the transmitted data comprises the message and the determined solution to the puzzle.

SUMMARY OF INVENTION

The proposed method advantageously provides a scheme that may be used in industrial networks for protecting such networks against attacks such as DoS attacks.

According to another aspect of the present subject disclosure, a proposed method for transmitting data in a computer network comprises, at a first node of the network: receiving a nonce of a computing puzzle from a puzzle server node of the network distinct from the first node; determining at least one solution to the puzzle using the nonce for transmitting a message to a second node of the network distinct from the puzzle server node; and transmitting data to the second node, wherein the transmitted data comprises a message and the determined solution to the puzzle.

According to yet another aspect of the present subject disclosure, a method for receiving data in a computer network is proposed, which comprises, at a second node of the network: receiving a computing puzzle from a puzzle server node of the network distinct from the second node; receiving data from a first node of the network distinct from the puzzle server node, wherein the received data comprises a message and a solution to the puzzle; determining whether the received puzzle solution is valid based on the received puzzle; and upon determining that the received puzzle solution is valid, processing a request comprised in the received message.

According to yet another aspect of the present subject disclosure, a method for receiving data in a computer network is proposed, which comprises, at a second node of the network: receiving a nonce of a computing puzzle from a puzzle server node of the network distinct from the second node; receiving data from a first node of the network distinct from the puzzle server node, wherein the received data comprises a message and a solution to the puzzle; determining whether the received puzzle solution is valid based on the received nonce; and upon determining that the received puzzle solution is valid, processing a request comprised in the received message.

In one or more embodiments of the proposed methods for receiving data, the proposed method may further comprise:

upon determining that the received puzzle solution is not valid, discarding the received message.

In one or more embodiments of the proposed methods (whether for receiving and/or transmitting data), the computing puzzle may be a cryptographic puzzle.

In one or more embodiments of the proposed methods (whether for receiving and/or transmitting data), the nonce may comprise a nonce value. In one or more embodiments of the proposed methods (whether for receiving and/or transmitting data), the nonce value may be based on a transmission time of the puzzle. In one or more embodiments of the proposed methods (whether for receiving and/or transmitting data), the nonce value is based on timestamp information included in a time synchronization message.

In one or more embodiments of the proposed method (whether for receiving and/or transmitting data), a new puzzle may be periodically received according to a predefined period.

In one or more embodiments of the proposed method (whether for receiving and/or transmitting data), a time value obtained based on time synchronization information in the computer network may be used, together with the received nonce, as parameter of the puzzle.

In one or more embodiments of the proposed method for receiving data, the method may further comprise: determining whether the received puzzle solution was already received from any node of the computer network.

In one or more embodiments of the proposed method (whether for receiving and/or transmitting data), a data stream identifier may be used, together with the received nonce, as parameter of the puzzle.

In yet another aspect of the present subject disclosure, a processor for a network node in a computer network is proposed, which is configured to perform a method as proposed in the present subject disclosure.

In yet another aspect of the present subject disclosure, an apparatus is proposed, which comprises a processor, a memory operatively coupled to the processor, and network interfaces to communicate in a computer network, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed. In another aspect of the present subject disclosure, a data set representing, for example through compression or encoding, a computer program as proposed herein, is proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

The present subject disclosure will be better understood and its numerous objects and advantages will become more apparent to those skilled in the art by reference to the following drawings, in conjunction with the accompanying specification.

DESCRIPTION OF EMBODIMENTS

Figure 1A:
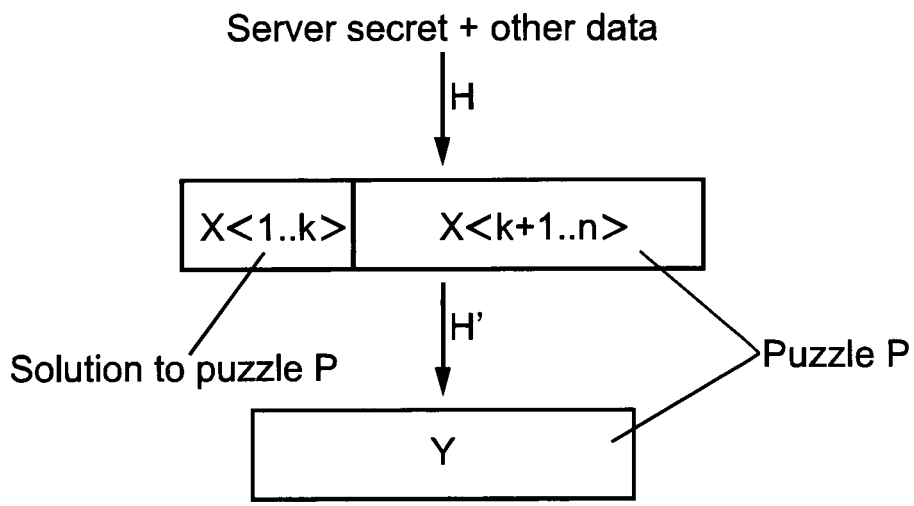
FIG. 1a illustrates an exemplary hash-based puzzle schemes that may be used in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive, SSD drives), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

As used herein, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the present subject disclosure, the terms "puzzle" and "computing puzzle", along with their derivatives, may be indifferently used to indicate data related to a problem that may be formulated with one or more parameters (e.g. a nonce), which in order to be solved involves computations performed by a machine or apparatus comprising a processor, for example by running one or more algorithms on a computer.

The term "nonce" will be used in the present subject disclosure to designate data used as a parameter of a computing puzzle which is necessary for determining a solution to the puzzle. Preferably, a nonce will be chosen as non-predictable by any apparatus comprising a processor that might be used to determine a solution to the puzzle. For example, each nonce used in an embodiment of the proposed method will be generated or obtained, at least for part of it, in a random manner.

In the present subject disclosure, the terms "cryptographic puzzle", "proof of work puzzle", "client puzzle", "cryptogram", along with their derivatives, may be indifferently used to indicate a puzzle the determination of a solution of which involves using a cryptographic function (e.g. an encryption function, a hash function, a compression function).

In the present subject disclosure, the terms "coupled" and "connected", along with their derivatives, may be indifferently used to indicate that two or more elements are in direct physical or electrical contact with each other, or two or more elements are not in direct contact with each other, but yet still co-operate or interact with each other.

In the present subject disclosure, the terms "payload", "payload data", "message", "packet", and "data packet" may be indifferently used, and may include data blocks, protocol data units or any unit of data that may be routed or transmitted between nodes or stations or across a network. A packet may include a group of bits, which may include one or more address fields, control fields and data, for example. A data block may be any unit of data or information bits.

For the purposes of the present subject disclosure, the term "server" is used herein to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of the present subject disclosure, a "computer network" should be understood to refer to a network that may couple devices (also referred to herein as "nodes") so that data communications may occur between devices, including between wireless devices coupled via a wireless network, for example. A network may also include mass storage, such as network attached storage (NAS), a storage area network (SAN), or other forms of computer or machine readable media, for example, and may include or be connected to a server. A network may include the Internet, one or more local area networks (LANs), one or more wide area networks (WANs), wire-line type connections, wireless type connections, cellular, such as carrier telephone lines, optical fibers, synchronous optical networks, synchronous digital hierarchy links, powerline communication links (e.g. IEEE 61334, IEEE P1901.2), Ethernet, Bluetooth, Bluetooth Low Energy (BLE) or Bluetooth Smart, WiFi or any connection based on a IEEE802.11x protocols, ZigBee or any connection based on the IEEE802.15.4 protocol, Z-Wave, 6LowPAN (IPv6 Low-power wireless Personal Area Network), Thread, Sigfox, Neul, LoRa, any NFC connection, 2G (including GSM/GPRS/EDGE)/3G (including UMTS/HSPA)/4G (including LTE and LTE-Advanced)/5G cellular, or any combination thereof. Various types of devices, for example gateways, may be made available to provide an interoperable capability for differing architectures or protocols used in the network. Any number of nodes, devices, apparatuses, links, interconnections, etc. may be used in a computer network according to the present subject disclosure.

A communication link or channel may include, for example, analog telephone lines, full or fractional digital lines, wireless links including satellite links, or other communication links or channels, such as may be known to those skilled in the art.

A computing device of a network, for example a sensor node or an actuator node, may be capable of sending or receiving signals, such as via a wired or wireless network, and/or may be capable of processing and/or storing data.

It should be understood that embodiments of the present subject disclosure may be used in a variety of applications, in particular, although not limited to, industrial networks, such as industrial buses or sensor networks in which a potentially large number of sensors cooperatively monitor physical or environmental conditions at different locations (e.g. in a factory or a nuclear plant facility). Although the present subject disclosure is not limited in this respect, the methods disclosed herein may be used in many types of computer network with various topologies, such as, for example, any LLN network, any daisy-chain topology network, any vehicle bus network, any multiple-hop system, e.g. mesh network, any Internet of Things (IoT) network or system, any Machine-to-Machine (M2M) network or system, e.g. smart object networks, such as sensor networks, or any combination thereof, and may be used in many apparatuses such as in any network node of a computer network, such as, for example, a root node, a gateway node, a sensor node, an actuator node, or in any server connected to or comprised in the computer network.

The proposed method can advantageously be deployed in communication systems that shall transport unidirectional data flows with critical timing and security constraints. In particular, the newly developed industrial control network based on Ethernet with message encryption and authentication support (such as OPC-UA PubSub) needs to be protected against some potential Deny-Of-Service attacks. Even if encryption and message authentication mechanisms address a large number of threats, they may be still vulnerable to DoS attacks because of implementation (hardware and software). Indeed, the authentication mechanism requires computing resource, and may be subject to depletion attacks. The present subject disclosure advantageously allows mitigation of DoS attacks on hardware platforms with low computational resources, which therefore allows cost reductions in the network while preserving network security.

Client cryptography puzzles have been introduced as a countermeasure against Denial of Service attacks in computer networks. In a client/server model, a client puzzle is a computable cryptographic problem that is submitted by a server to a client upon receipt of a request from the client. The client must solve the problem and provide the solution to the server as a condition to the server processing its request. At the server side, the solution provided by the client is first quickly verified to check whether it is correct or not, and the request previously received from the client is processed only in the case where the received solution is correct. In order to ensure a good efficiency of the client cryptography puzzle schemes, the puzzles are usually designed so that the resources (computational and memory) required to solve the puzzle problem are much more important than the resources required to verify the correctness of the solution. Therefore, while legitimate clients will experience only a few additional computations to submit a request to the server, an attacker must have access to large computational resources to generate enough requests to create a DoS attack with significant impact on the server's performance. The submitted problem is typically formulated using server secret or nonce values, time, and additional client specific information.

Preferably, the puzzle solution must be unique so that replay by the client or by eavesdropping devices is not possible.

In addition, the puzzles may preferably be designed in such a way that no client is able to predict the puzzles that are received from a defending server. In this manner, clients are unable to compute puzzle solutions in advance.

The complexity of the puzzles can also be adjusted according to the stress of the server, and therefore according to the strength of an attack.

Different classes (types) of puzzles have been proposed to address attacks such as DoS attacks, among which the class of CPU-bound puzzles is the largest class of client puzzles.

For example, computing the solution of a so-called "hash-based puzzle" typically requires performing computations involving a cryptographic hash function.

According to one example of a hash-based puzzle scheme, a portion of the reverse of the hash may be provided to the client so that it can solve the puzzle, that is find the remaining part of the reverse hash, by brute force (that is, using random tries). As illustrated on FIG. 1a, the puzzle P may consist in a portion of a bitstring X of length n bits (n–k bits:$X<k+1 \ldots n>$), along with a bitstring Y, where Y is the hash value of the bitstring X. The solution of the puzzle P consists in the missing k bits of X:$X<1 \ldots k>$, which may be assumed to be unique so that the hash value of X is equal to Y.

Figure 1B:
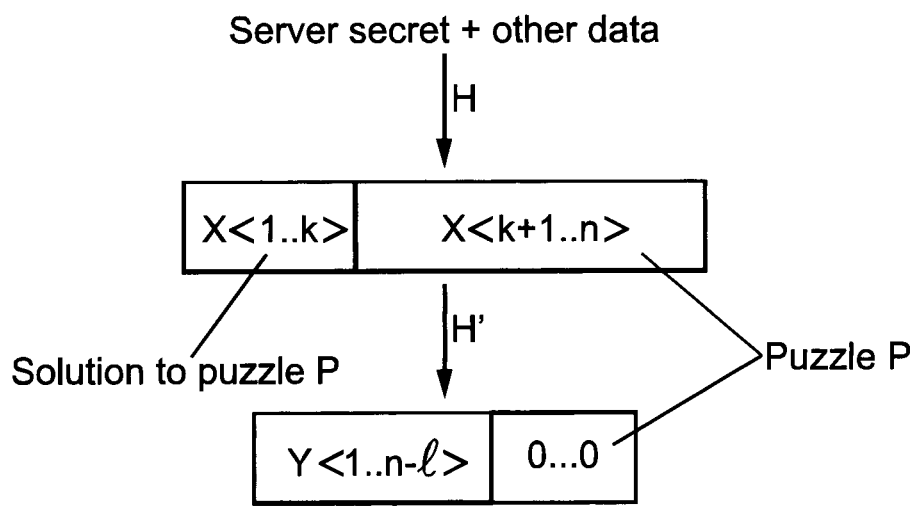
FIG. 1b illustrates an exemplary hash-based puzzle schemes that may be used in accordance with one or more embodiments.

In another example of a hash-based puzzle scheme illustrated on FIG. 1b, the puzzle P may consist in a portion of a bitstring X of length n bits (n–k bits:$X<k+1 \ldots n>$), and a number 1 of bits equal to zero at the beginning of a bitstring Y, where Y is the hash value of the bitstring X. The solution of the puzzle P consists in the missing portion of X, which can be determined by brute force while complying to the condition that the least significant bits of the hash value Y are equal to 0.

Figure 1C:
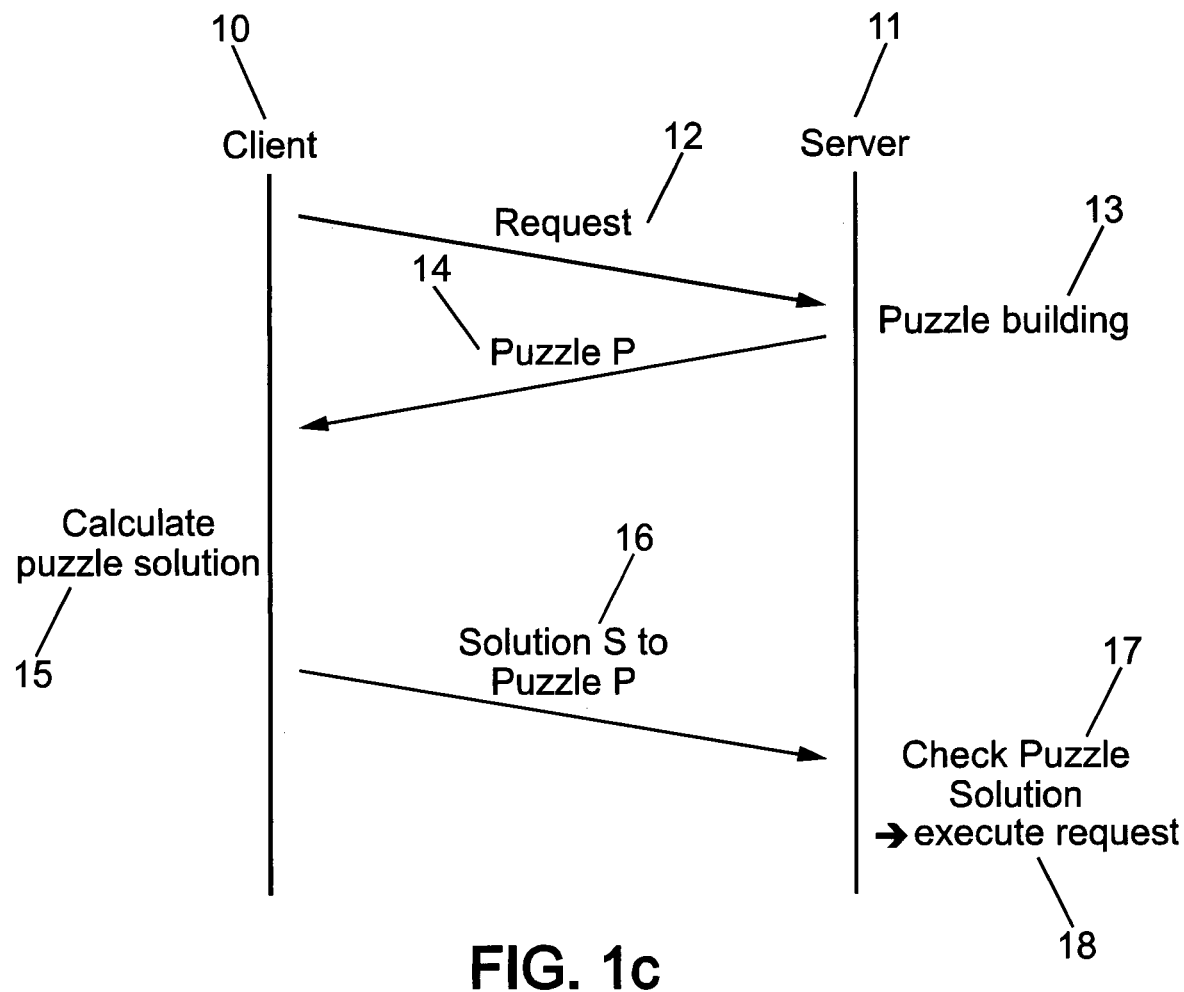
FIG. 1c illustrates a client-server puzzle protocol between a client and a server.

FIG. 1c illustrates a typical client-server puzzle protocol between a client (10) and a server (11).

In the client-server client puzzle protocol scheme, the client has to first contact the server a request in order to receive a puzzle and solve it before the request is processed. As illustrated on FIG. 1c, the client (10) first transmits (12) a request to a server (11). Upon receipt of the request, the server (11) generates (13) a puzzle P, and transmits (14) the puzzle P to the client (10). Upon receipt of the puzzle P, the client (10) calculates (15) the solution S to the puzzle P, and transmits (16) such solution S to the server (11). Upon receipt of the solution S, the server (11) checks (17) the solution, and if the solution S is correct, the server (11) executes (18) the request received initially from the client (10).

As can be seen on FIG. 1c, the client-server client puzzle protocol scheme involves the exchange of several puzzle-related messages between a client and a server. This leads to an increase of the network latency to execute the client request. In addition, the client-server client puzzle protocol scheme is not applicable in some unidirectional communication schemes, such as the broadcast or multicast communication schemes.

Depending on their architecture and topology, some computer networks (e.g. used in the industry) may use for some part of the network or some communications in the network, broadcast and/or multicast communications.

In addition, industrial computer networks such as field-bus systems may be configured to be used for time-critical data communications. For example, industrial or automotive buses may mix heterogeneous devices of different computational capacities (e.g. devices with very low to high computational capacity). That said, even devices with low computational capacity may have the ability to transmit packets at high speed on a network interface by simply duplicating packets and changing a small number of bytes inside a packet. This leaves the possibility to an attacker that corrupts any device to lead a DoS attack against any other device connected to the bus.

Furthermore, some communication systems use encrypted and authenticated (e.g. signed) data flows, for example via a code (sometimes referred to as a Message Authentication Code (MAC) inserted by a transmitting node in each message before transmission for authentication purposes. The node of the network that receives a message bearing a MAC code may use such code to verify that the message was not transmitted by a malicious or corrupted node. However, checking a Message Authentication Code may be a rather resource-consuming operation, in particular for nodes with low computational capacity, which limits the use of authenticated data flows. In addition, such checking of a MAC code may be subject to DoS attacks. Indeed, at the receiver, the authentication process may typically require to process the whole signed data. Therefore, even if the attacker does not have access to the signing key, it may generate a large number of corrupted messages with a wrong signature (that is, an incorrect MAC code). In order to verify each received message, the receiver will still have to calculate the MAC for each received message, so as to check it for the received message. If the signature algorithm performance is lower than the data link speed, then the attacker will likely be able to exhaust resources at the receiver and prevent it from executing legitimate requests, in particular legitimate requests that are time critical.

The scheme for puzzle submission to the client also raises some issues, since it generally requires specific message exchanges between a client and a server. Therefore, in addition to computational resources required to solve and verify the puzzles, the client puzzle protocol schemes consume some network bandwidth.

Figure 1D:
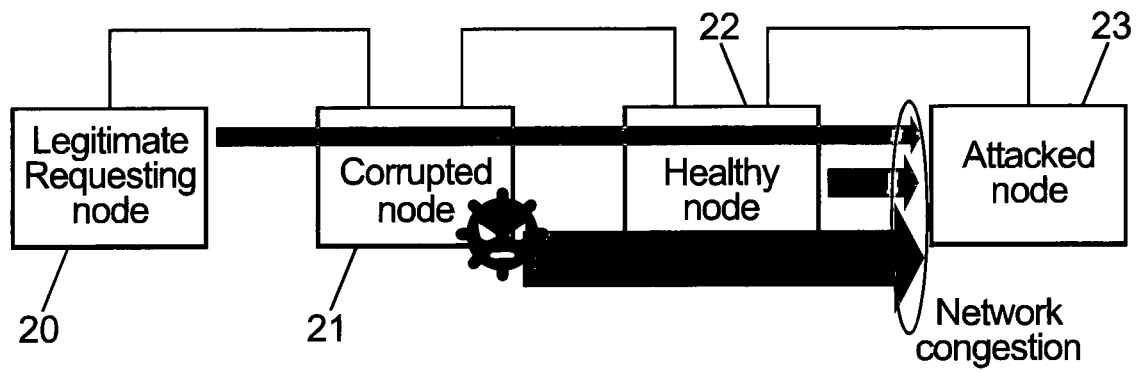
FIG. 1d illustrates a network congestion generated by a corrupted node in a daisy-chain topology network.

Moreover, depending on the network topology and architecture, an attacker running a DoS attack may also induce network congestion in some parts of the network, or disturb the normal running of intermediate network nodes. For instance, industrial field network buses may be deployed in a daisy-chained topology, as illustrated on FIG. 1d. In this topology, each network node is connected in series to a next network node. If one node is corrupted (node (21) on FIG. 1d), it may flood any device located after it in the chain (nodes (22) and (23) on FIG. 1d). For such situations defense strategies based on network stream policing using network metrics such as rate limiting may lack efficiency, as such methods cannot distinguish valid messages from flooding ones. Therefore, in order to address the threat of such attacks, there is a need to identify and filter the flooding messages in the healthy network node (20) that is closest in the data path to the corrupted node (21), while not in the path between the corrupted node (21) and the attacked node (23).

Figure 2A:
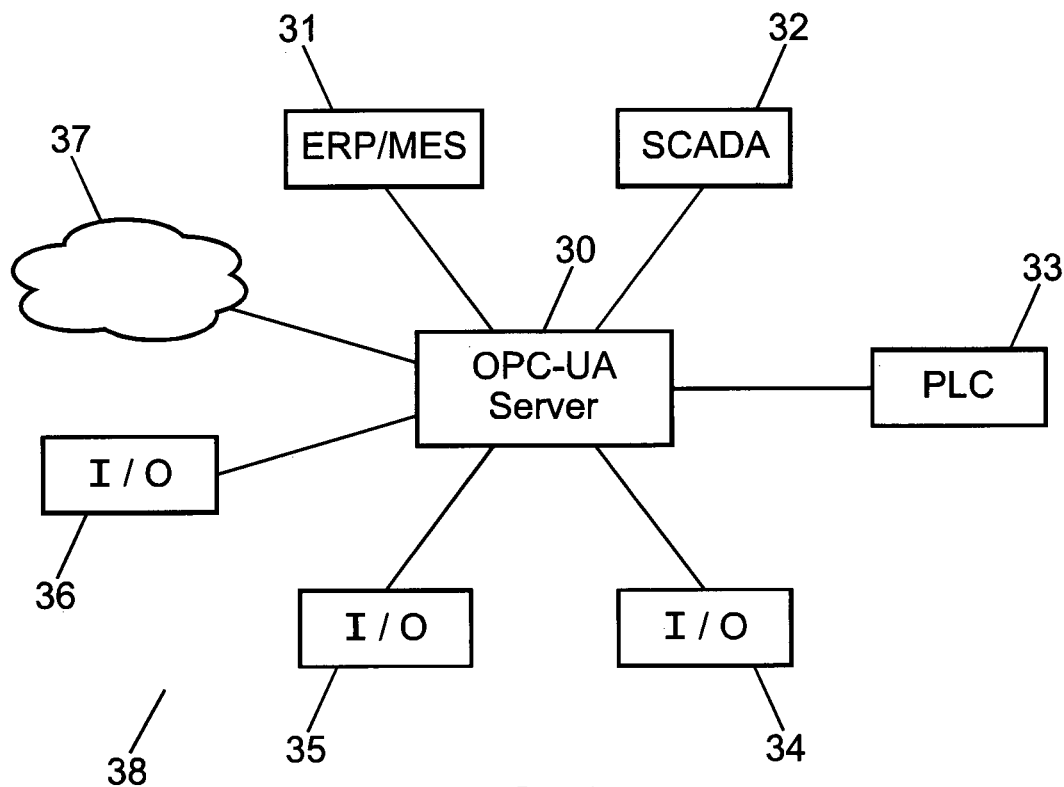
FIG. 2a illustrates an exemplary computer networks to which the proposed methods may be applied according to one or more embodiments.
Figure 2B:
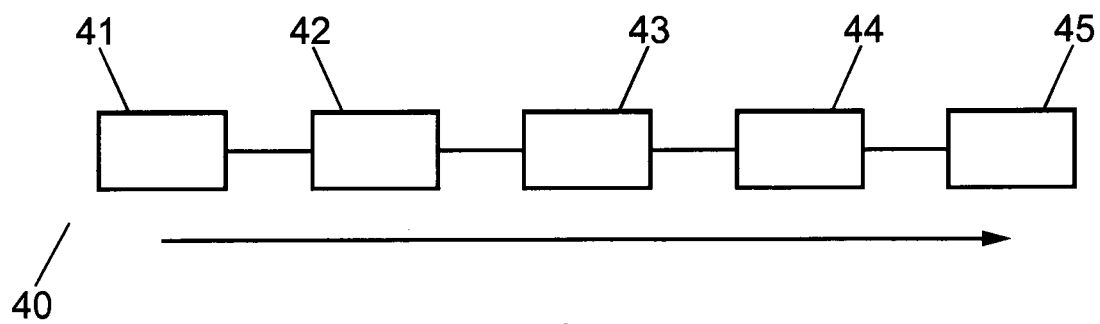
FIG. 2b illustrates an exemplary computer networks to which the proposed methods may be applied according to one or more embodiments.

FIGS. 2a and 2b show exemplary computer networks to which the proposed methods may be applied according to one or more embodiments.

FIG. 2a shows a star-topology network (38) with a server (30) connected via Ethernet links to a plurality of nodes (31-36), and to an externally hosted cloud (37). A node (31) may perform Manufacturing Execution System and/or Entreprise Resource Planning (ERP) functions, a node (32) may be performing monitoring, control and supervision of product line functions (Supervisory Control And Data Acquisition, SCADA), a node (33) may be performing regulation of machines and systems functions through one or more programmable logic controller(s) (PLC), and one or several nodes (34-36) may perform interface functions with sensors and/or actuators of a system.

The network (38) showed on FIG. 2a may use the OPC-UA protocol designed for data communications in the industrial field, so that the server may be configured as OPC-UA server, and the other nodes as OPC-UA clients. Further, one or more nodes may be configured as OPC-UA Publisher and/or Subscriber.

FIG. 2b shows a daisy-chain topology network, with a unidirectional data flow. Messages may be transmitted from each node (41-45) to another node down the data communication path illustrated by the arrow on the figure.

Figure 3A:
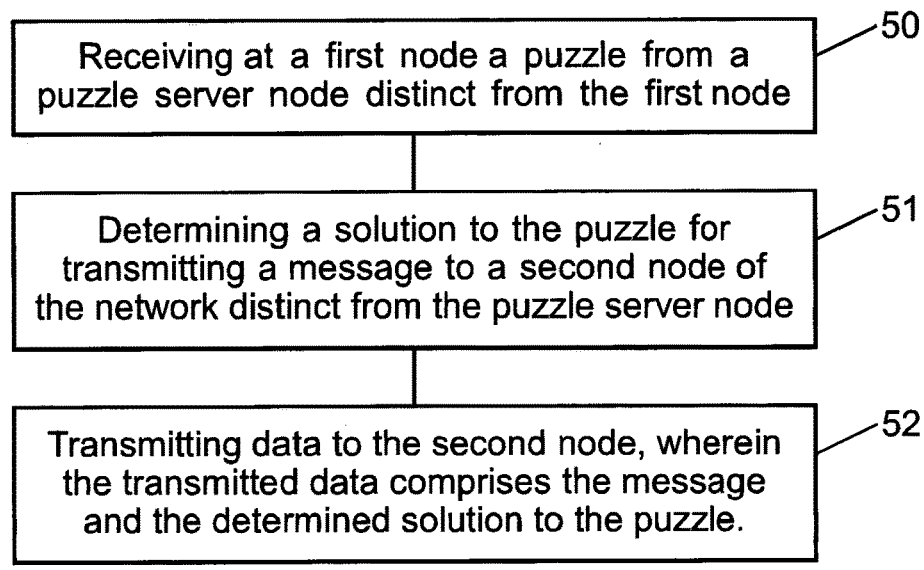
FIG. 3a illustrates an exemplary data transmission scheme according to one or more embodiments.

FIG. 3a shows an exemplary data transmission scheme according to one or more embodiments of the present subject disclosure.

As shown on FIG. 3a, a first network node configured for implementing the proposed data transmission scheme may receive (50) from a puzzle server node a computing puzzle.

In one or more embodiments, the computing puzzle may be formulated with a nonce, so that the first network node may receive a nonce, and may be configured to consider that it has received a puzzle through the reception of a nonce of the puzzle.

In one or more embodiments, the computing puzzle may be a cryptographic puzzle, in which case it may be formulated with a nonce value, that is, a nonce data which represents a number or a bitstring. The nonce value may typically be drawn randomly for part or the entirety thereof, so that it may comprise at least a portion thereof that is random, as described in the examples provided below.

In one or more embodiments, the computing puzzle may be of a different type. For example, it may correspond to a problem for which the determination of a solution by a machine or apparatus comprising a processor may involve recognition of one or more patterns in nonce data, for example using an artificial intelligence engine. In such case, the nonce data used for formulating the puzzle may correspond to an image, part or all of which has been randomly selected in a set of images, and determining a solution of the computing puzzle may require the recognizing of predefined patterns (e.g. a traffic light, a car, an animal, etc.) in the nonce data.

In one or more embodiments, the first node may determine (51) at least one solution to the puzzle, based on the received puzzle, to be used for transmitting a message to another node of the network (second node), different from the puzzle server node. In some embodiments, the first node may determine a solution to the puzzle based on a received nonce of the puzzle.

Once a solution to the puzzle is determined, the first node may transmit (52) data to the second node, which data comprises the message to be transmitted to the second node, and the determined solution to the puzzle.

In some embodiments, the transmitted data may comprise an indication of an association between the transmitted message and the transmitted solution to the puzzle, which depending on the embodiment may be implicit or explicit. In some embodiments, the first node may advantageously use such indication to transmit several messages to the second node, each associated with a (preferably single) solution to the puzzle. For example, in some embodiments, the transmitted message may comprise the determined solution to the puzzle. In such case, the indication is implicitly conveyed through the inclusion of the solution to the puzzle in the corresponding message. Using an implicit indication advantageously avoiding consuming bandwidth for purposes of transmitting data indicating a message to which a puzzle solution is associated.

In embodiments where the indication of association between puzzle solution and message is explicit, for example using an identifier, the data carrying the indication may be protected against potential attacks, for instance by using a non-predictable value (for example by using a partially or totally random value) that is known only to the transmitting node (node transmitting the message, the solution and the indication), and to the receiving node (node receiving the message, the solution, and the indication).

Depending on the embodiment, the puzzle may be a computation puzzle dimensioned for the computational capabilities of the nodes of the network using the proposed scheme.

Figure 3B:
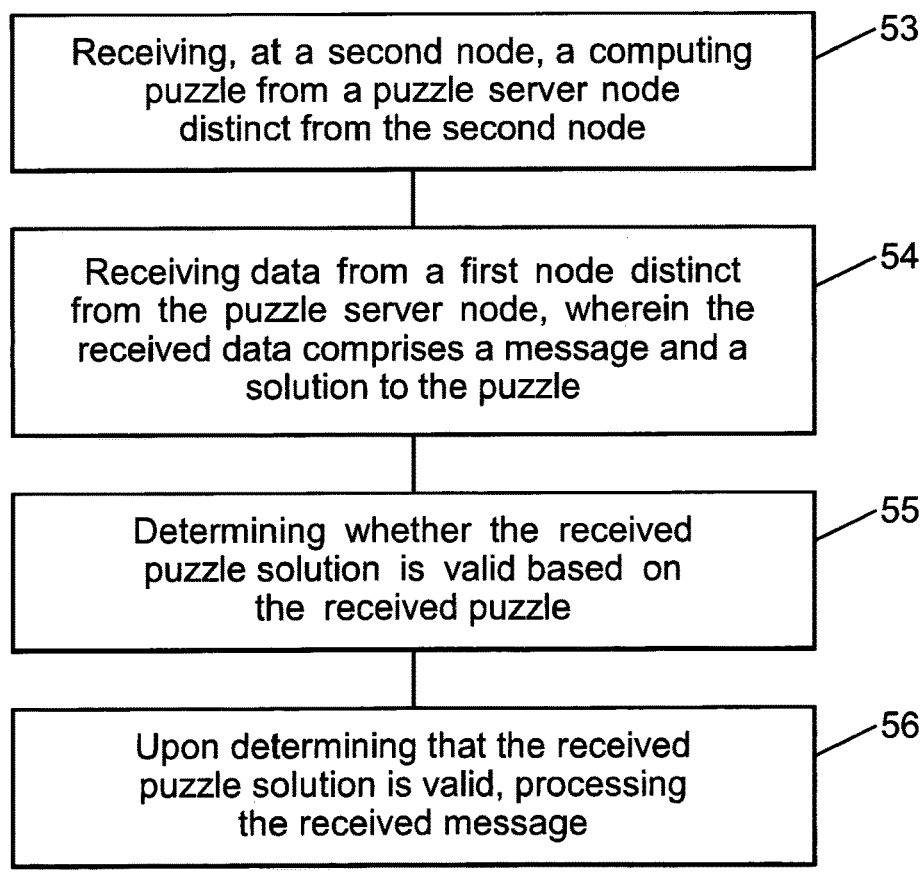
FIG. 3b illustrates an exemplary data reception scheme according to one or more embodiments.

FIG. 3b shows an exemplary data reception scheme according to one or more embodiments of the present subject disclosure.

As shown on FIG. 3b, a second network node configured for implementing the proposed data transmission scheme may receive (53) a computing puzzle from a puzzle server node distinct from the second node.

In addition the second network node may receive (54) from a first node (also distinct from the puzzle server node) data which comprises a message and a solution to the puzzle.

The second node may then check the received solution, that is, determine (55) whether the received solution is valid, based on the received puzzle.

As described above with respect to FIG. 3a, in one or more embodiments, the computing puzzle may be formulated with a nonce, so that the second network node may receive a nonce, and may be configured to consider that it has received data to be used for checking at least one received solution to the puzzle through the reception of a nonce of the puzzle.

As also described above with respect to FIG. 3a, depending on the embodiment, the computing puzzle may be a cryptographic puzzle, or may be of a different type.

Upon determining that the received solution is valid, the second node may process (56) the received message.

In some embodiments, cryptography puzzles, such as hash-based puzzles, may be used.

In some embodiments, the received data may comprise an indication of an association between the received message and the received solution to the puzzle, which depending on the embodiment may be implicit or explicit.

For example, in some embodiments, the received message may comprise the solution to the puzzle. In such case, the indication is implicitly conveyed through the inclusion of the solution to the puzzle in the corresponding message.

The proposed data transmission scheme therefore provides that a puzzle be received by a node, which puzzle is used in the case where the node wants to transmit a message to another node. The node may be configured so that it does not transmit a message to another node of the network without first solving a puzzle received from a puzzle server node, and transmits the message to the other node as well as a determined solution to the puzzle.

The proposed data reception scheme provides that the puzzle be also received by a node, which puzzle is used in the case where the node receives a message from another node. The node may be configured so that it does not receive or process a received message from another node of the network without first checking that a solution received by the same transmitting node in relation to the transmitted message is valid. As a consequence, using a puzzle for which computation of a solution is computationally much more expensive than checking a solution, will advantageously mitigate the risk of DoS attacks in the computer network, while limiting the use of network bandwidth between the transmitting node and the receiving node as well as use of resources at both nodes. The limited amount of computing resources that may be needed to check a puzzle solution associated with a received message may be advantageously leveraged in networks with nodes which may only receive messages with very limited computational resources, and still provide an efficient solution for protecting such nodes from attacks.

In some embodiments, the receiving node may be configured to discard a received message if such message is not received with a solution to a received puzzle. In some embodiments, the receiving node may be configured to discard a received message if such message is received with an invalid solution to a received puzzle.

The transmission of a message at the transmitting node, and the reception of the message at the receiving node, may then both be conditioned based on a puzzle received by both the transmitting node and the receiving node, e.g. from a puzzle server node of the network.

As the puzzle is received from a server node different from the node to which the message is to be sent, the proposed scheme advantageously limits the signaling overhead as well as the network latency generated by the proposed scheme. In addition, the proposed scheme is advantageously applicable to unidirectional communication schemes, such as broadcast or multicast communication schemes.

According to some embodiments, the present subject disclosure proposes a cryptographic scheme to mitigate DoS attacks that may advantageously be used in critical communication systems that already implement network security with data encryption and authentication mechanisms. The proposed scheme may advantageously be applied to a variety of network architectures and protocols, including for unidirectional data flows such as multicast that are used for instance in new industrial field-bus protocol based on a so-called "publish/subscribe" model. Indeed, in this kind of networks, because of device heterogeneity in terms of available computational resources, a receiving device may be easily flooded by an attacker by sending a large set of signed messages with a wrong signature.

In one or more embodiments, the proposed method uses the resolution of a cryptographic puzzle by a node desiring to transmit a message to another node, forcing the transmitting node to spend time (and computational resources) prior to transmitting the message. Unlike conventional methods, it has a very limited impact on the message delivery latency (which is important in critical system) and generates little signaling overhead. It also advantageously allows in some embodiments identifying and filtering malicious flooding traffic in any intermediate node, which prevents the occurrence of a possible network congestion created by the attack. Furthermore, the proposed scheme is advantageously designed to be resilient to possible replay, pre-calculation or impersonation attacks, and can also be easily deployed over light microcontroller-based devices.

The proposed scheme further advantageously addresses a current need for a new cryptographic puzzle protocol scheme adapted to some communication systems that shall support digitally signed unidirectional data flows between synchronized nodes.

For instance, the newly developed communication protocol OPC Unified Architecture (specified by the OPC Foundation, with the acronym "OPC" standing for "Open Platform Communication") designed for industrial communication buses, for example for industrial automation applications, includes a client/server-based protocol (which may rely over the TCP/IP protocol stack (as specified by the Internet Engineering Task Force (IETF)), and further includes a publish-subscribe (PubSub) scheme for real-time communication, each of which may rely over Ethernet. Because of security requirements, the OPC-UA PubSub protocol natively implements encryption and authentication of every protocol message, through a Message Authentication Code (MAC) which is calculated over data contained into the message using a secret signing key, and added at the end of the message. At the receiver side, the MAC in the received message is systematically verified. This operation requires quite important computational resources and adds latency.

Another example of communication systems that shall support digitally signed unidirectional data flows between synchronized nodes is audio/video broadcast systems relying over IEEE 802.1AVB that shall convey unidirectional encrypted audio/video data flows.

In some embodiments, the proposed methods may use a hash-based puzzle that consists in finding a bitstring solution X such that the m least significant bits of the hash value of X concatenated with another bitstring Z provided by the protocol is equal to a predetermined bit stream Y, that is $LSBm[H(x|z)]=Y$.

In one or more embodiments, to prevent from pre-calculation attacks, the puzzle may be formulated with a common nonce (for example a nonce value), preferably chosen so that it cannot be predicted. This nonce n may be conveyed by a specific message, for instance referred to as "Nonce Puzzle Control" (NPC) message that may be provided to nodes of the network configured to use the proposed process, for example using broadcast and/or multicast data transmissions. The NPC message may in some embodiments be periodically transmitted with a given frequency over the network by a master node.

In some embodiments, new puzzles may be repeatedly transmitted by a puzzle master node, so that each puzzle received by a node may be considered valid for use by such node until a new puzzle is received. In some embodiments, the nodes may be configured for receiving a new puzzle at predetermined periods of time, so that a new puzzle may be periodically received by the nodes according to a predefined period. The repeated, for example periodic, transmission of puzzles to nodes using the proposed method advantageously allows to set the duration between two successive puzzle transmissions to a chosen value depending on various network parameters, for example depending on bandwidth constraints in the computer network. For example, the duration between two successive puzzle transmissions may be chosen sufficiently large so that the puzzle transmissions to the nodes of the network may not consume an undesirably high amount of network bandwidth. Inversely, the duration between two successive puzzle transmissions may be chosen short enough to ensure that the puzzles used by the nodes are frequently renewed to ensure a higher security against attacks.

In one or more embodiments, the nonce value transmitted to nodes for transmitting the puzzle to such nodes may be based on a transmission time of the puzzle. In some embodiments, a transmission time of the NPC message may be used as a common nonce value by all network nodes configured for calculating or verifying puzzle solutions according to the present subject disclosure.

In some embodiments, in which a puzzle that includes a nonce value is repeatedly transmitted (for example broadcast with a given period), a nonce value based on a transmission time of the puzzle may be part of the puzzle, and may be valid until a new nonce value is transmitted. Preferably, the puzzle server node configured for generating puzzles based on their transmission time may be configured so that a generated nonce value cannot be predicted by any node (in particular an attacker), which advantageously avoids puzzle solutions pre-calculation. To that end, in some embodiments, the transmission time that is used for generating a nonce value may be chosen precise enough (e.g. up to the nanosecond) so that it necessarily carries a random part that prevents other nodes from predicting it.

In one or more embodiments where the nodes are comprised in a time synchronized network, the time synchronization protocol that is used to synchronize node's local clocks with a network clock may advantageously be used to distribute nonce values that are based on their transmission time, thereby reducing the bandwidth usage associated with the distribution of the puzzle. For example, in embodiments where the Precision Time Protocol (as defined in the IEEE-1588 standard) is used for time synchronization of network nodes, the timestamp data representing the transmission time of the "Sync" PTP message as indicated inside the following-up "FollowUp" PTP message may be used by the nodes receiving the Sync and FollowUp PTP messages as common nonce value. Therefore, data contained in broadcast messages of a time synchronization protocol may be used as common nonce value by nodes of the time synchronized network. This proposed puzzle distribution scheme advantageously avoids the use of a specific message to distribute a puzzle to nodes in the network, with alleviates the need for extra network bandwidth associated with the distribution of a puzzle in the network.

A person skilled in the art would understand that, even though the present description refers to the PTP protocol as an example of time synchronization protocol that may be used in one or more embodiments, any other suitable time synchronization protocol, such as, for example, the IETF Network Time Protocol (NTP) protocol, as specified in the Request for Comments (RFC) 5905, may be used in place of the PTP protocol, which is given by way of an example only.

In one or more embodiments, the puzzle to be used by a node of interest (transmitting node and/or receiving node) of the computer network may be formulated with a plurality of parameters, including a nonce parameter obtained by the node of interest according to a puzzle distribution scheme (the nonce parameter may be provided by a puzzle server node or by another server node of the network (e.g. a time-synchronization server node) as described above), and one or more parameters obtained by the node of interest independently of a puzzle distribution scheme, such as used for distributing the nonce parameter. Said otherwise, the nodes configured to use the proposed method may use puzzles formulated at least with a nonce parameter (received from a puzzle server node or from another type of server node as described above with respect to time-synchronized networks) as well as with one or more parameters (referred to as "implicit" puzzle parameters because they are not distributed to the nodes as part of a puzzle distribution scheme) obtained in the course of performing a function other than puzzle distribution-related.

For example, in some embodiments, a time value obtained based on time synchronization information in the computer network may be used, together with the received nonce (which is not an implicit puzzle parameter when obtained through a puzzle distribution scheme for transmitting puzzle parameters to the nodes), as (implicit) parameter of the puzzle. Other implicit puzzle parameters may be used in combination with the time value implicit puzzle parameter and the nonce parameter.

The following provides an exemplary embodiment of use of such a time value as implicit parameter of the puzzle with respect to a time-synchronized network in which communicating nodes are time-synchronized and share a common clock.

To enforce the puzzle against replay attacks (i.e., attacks in which the attacker uses a single puzzle solution for transmitting numerous messages), the puzzle may in one or more embodiments be formulated with a time value which is not part of the nonce. That is, the puzzle used according to such embodiments, whether by a transmitting node or a receiving node, may have several parameters, including a nonce parameter and a time value parameter.

In some embodiments, where the nodes of the time-synchronized computer network have a local clock that is synchronized with a network clock, the time domain may be divided based on a predefined period (also referred to as a "cycle"), so that a time may be identified by a cycle number (or index) in a sequence. In other words, the time domain may be divided into cycles of a predetermined duration (e.g., 100 ms), so that a time value may correspond to a cycle index in an indexed sequence of cycles.

Therefore, in one or more embodiments in which the proposed method is used in a time-synchronized network in which nodes are time-synchronized, each node may be configured to compute a cycle index based on its local clock. For example, any node may be configured to obtain (e.g. receive from the network or determine) a current cycle number. The determination of the current cycle number may involve computing the (e.g. integer) division of the current time (based on the local clock which is synchronized with a network clock) by a predefined cycle duration. In some embodiments, an index of the current cycle as computed by a node using the proposed method may be used as an additional puzzle parameter, besides a nonce distributed to nodes by a puzzle master as part of the puzzle.

In such embodiments, a node configured to use the proposed method may be configured to use the obtained cycle index as part of the puzzle to be used (for determining a solution at a transmitting node, and for checking a received solution at a receiving node), so that a transmitting node that must transmit several messages inside a single cycle may be configured to solve the same puzzle based on a received nonce and an obtained index for the cycle. In this manner, the generated solution can advantageously be unique during each cycle. In some embodiments, the receiving node may be configured to check that the puzzle solution was not already submitted during the current cycle, before verifying the puzzle solution. As a consequence, in some embodiments, a time value corresponding to a cycle index may be used in the formulation of the puzzle used by transmitting nodes and receiving nodes, so that each cycle may determine a puzzle, with the immediately following cycle determining another puzzle. The cycle index may therefore be used as a puzzle parameter, with the advantage that this additional parameter may not be distributed to the nodes as the nonce parameter is, as this additional parameter may be computed at each node of a time-synchronized network. This scheme advantageously increases the number of puzzle parameters, which improves the node protection against attacks, while not generating additional signaling overhead associated with the distribution of the puzzle. Further advantageously, the duration of a cycle may be chosen short, so that the duration of validity of a puzzle is equally short, and the puzzles are frequently updated.

Figure 4:
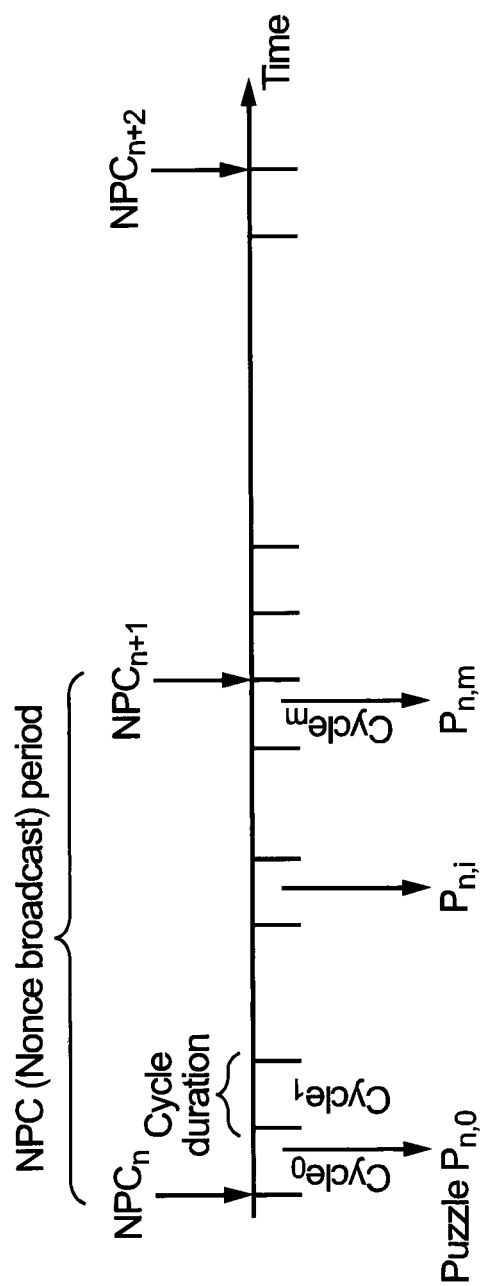
FIG. 4 illustrates exemplary cycles that may be used for puzzle operations according to one or more embodiments.

FIG. 4 illustrates cycles that may be used for puzzle operations according to embodiments of the present subject disclosure. As illustrated on FIG. 4, messages carrying a nonce for a puzzle P may be substantially periodically broadcast in the computer network, with a predefined nonce broadcast period. Examples of such messages are illustrated on FIG. 4 as Nonce Puzzle Control (NPC) messages $NPC_n$, $NPC_{n+1}$, and $NPC_{n+2}$. The time period in between two successive nonce distribution messages may be divided into m+1 cycles of a predefined cycle duration: $Cycle_0$, $Cycle_1, \ldots, Cycle_m$. For each cycle $Cycle_i$ corresponding to an NPC message $NPC_n$ (that is, the last received NPC message at the beginning of the cycle $Cycle_i$) a node configured to use the proposed method (transmitting node determining one or more puzzle solutions or receiving node checking one or more received puzzle solutions) may derive a puzzle $P_{n,i}$ from a nonce received in the corresponding NPC message $NPC_n$ and from the cycle index i.

Figure 5A:
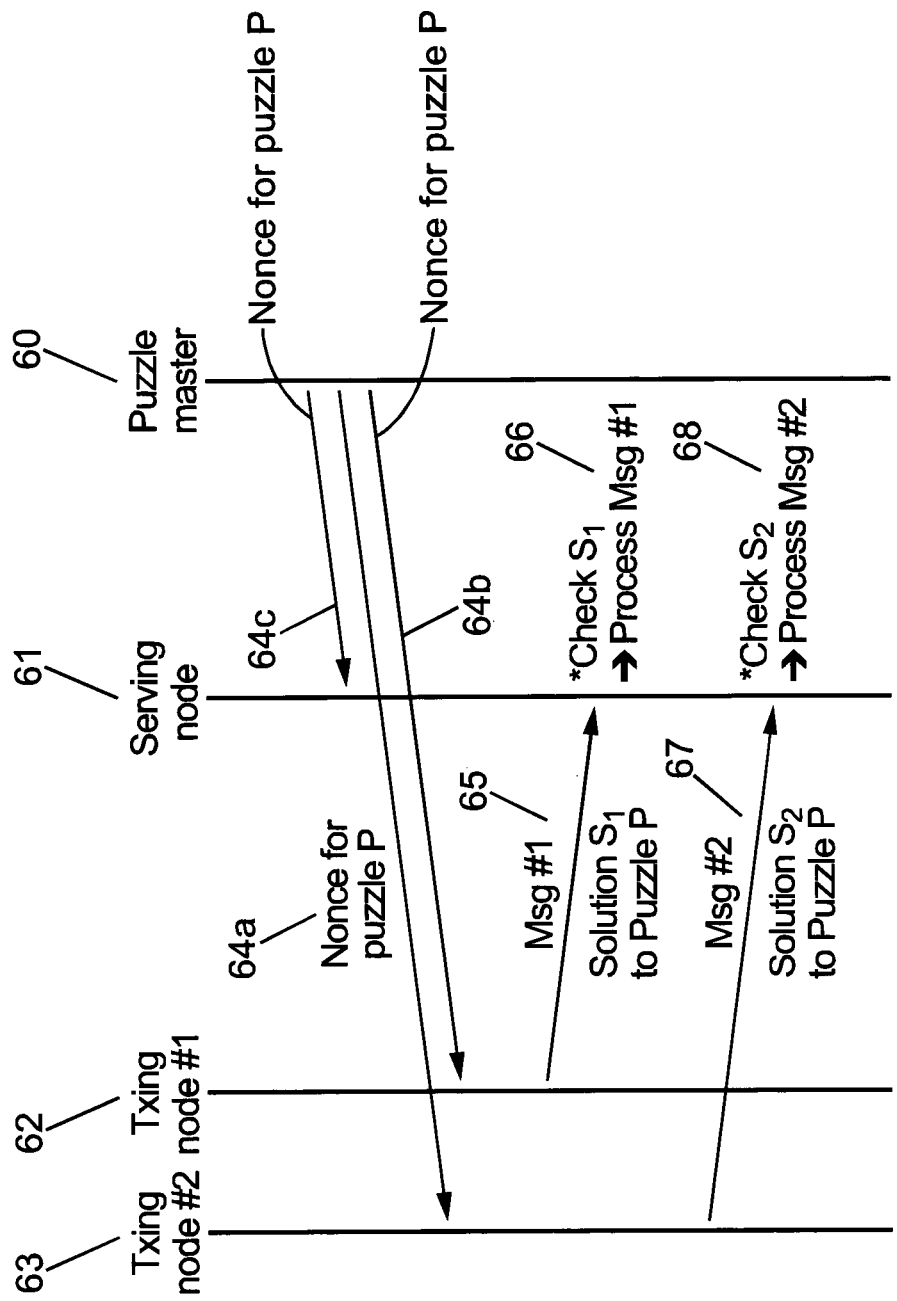
FIG. 5a illustrates an exemplary data communication scheme according to one or more embodiments.

FIG. 5a illustrates an exemplary data communication scheme according to one or more embodiments of the present subject disclosure.

Referring to FIG. 5a, in one or more embodiments, a puzzle server node may be configured for providing a puzzle P formulated with a nonce, for example, a nonce value (e.g. a non-predictable (partially or totally random) value) to each of a plurality of nodes of the network. For example, as illustrated on FIG. 5a, a so-called "puzzle master" node (60) transmits (64a, 64b, 64c) to a first transmitting node (62), to a second transmitting node (63), and to a service node (61) a nonce value for a puzzle P.

In one or more embodiments, in order to have a message transmitted to another node be processed by such other node (for example, in order to have a request sent to another node be served by such other node), a valid puzzle solution must be obtained (e.g. computed) and transmitted by the node transmitting the message and provided to the destination node so that the message be processed. For example, in some embodiments, in order to complete a request, a valid puzzle solution must be computed by any requesting node sending a request to a serving node.

In one or more embodiments, the solution computed by the transmitting node may be sent along the transmitted message. In some embodiments, the computed solution may be embedded into the transmitted message.

In some embodiments, a solution to the last received puzzle may be embedded into each transmitted message.

At the receiving node, the puzzle solution received along a received message may be verified prior to processing the message. In some embodiments, the solution may be verified at the receiving node prior to any other processing operations, including message authentication if supported. In the case where the received message includes the solution to the puzzle, the message may first be processed to extract the puzzle solution, and once the puzzle solution is determined to be valid, the message may be further processed.

In embodiments where a hash-based puzzle is used that consists in finding a bitstring solution X such that the m least significant bits of the hash value of X concatenated with another bitstring Z provided by the protocol is equal to a predetermined bit stream Y (LSBm[H(x|z)]=Y), signature verification, that is, checking the received solution to the puzzle may advantageously merely consist in calculating the hash value of the puzzle solution X concatenated with Z, and checks whether the m least significant bits of the result correspond to Y. This operation is typically much lighter and faster, from a computational expense viewpoint, than computing a solution to the puzzle. Therefore, while a potential attacker will be deterred from sending a high number of messages with associated solutions to another node of the network, such other node will not require high computational resources for defending itself against such DoS attacks, as checking a received solution will be computationally inexpensive.

For example, as illustrated on FIG. 5a, a transmitting node #1 (62) computes a solution (S1) to the puzzle P received (64b) from the puzzle master (60), then transmits (65) a message Msg #1 that includes a Request #1 along with (possibly comprising) the solution S1 to the puzzle P, to the serving node (61). Likewise, a transmitting node #2 (63) computes a solution (S2) to the puzzle P received (64a) from the puzzle master (60), then transmits (67) a message Msg #2 that includes a Request #2 along with (possibly comprising) the solution S2 to the puzzle P, to the serving node (61).

The serving node (61) may be configured for, upon receiving the message Msg #1 and the solution S1, checking (66) the solution S1, and once the solution S1 is determined to be valid, process the Msg #1, for example to serve the Request #1. Likewise, the serving node (61) may be configured for, upon receiving the message Msg #2 and the solution S2, checking (68) the solution S2, and once the solution S2 is determined to be valid, process the Msg #2, for example to serve the Request #2.

As discussed above, the proposed method does not rely on a puzzle formulated with a receiving node secret. For example, in embodiments where a hash-based puzzle is used that consists in finding a bitstring solution X such that the m least significant bits of the hash value of X concatenated with another bitstring Z provided by the protocol is equal to a predetermined bit stream Y (LSBm[H(x|z)]=Y), the bitstring Z may not include any secret shared between the transmitting and receiving nodes. Further advantageously, there is no need for some prior message exchanges between the transmitting node and the receiving node to get any secret. In addition, the proposed process advantageously allows for any node on the message route between the transmitting node and the receiving node to check the puzzle solution conveyed by any message, since such node will have received the puzzle from a puzzle master.

In one or more embodiments, uniqueness of a solution for a puzzle P may be verified upon receipt using a look-up table storing the puzzle solutions already used and verified with respect to the puzzle P. A look-up table (referred to herein as "puzzle solution LUT") may be maintained at each node of the network configured for using the proposed method for receiving data, and for a given node may be used to stored puzzle solutions already used and verified with respect to different puzzle in relation with the corresponding puzzle. A node configured for managing a puzzle solution LUT may be configured for clearing its table upon change of at least one predetermined puzzle parameter (e.g. upon change of a nonce parameter and/or upon change of a time value parameter, depending on the node configuration). That is, upon change of a puzzle parameter that is configured for triggering a flush of a puzzle solution LUT, the look-up table may be cleared, so that it can be reused for other puzzles. The look-up table may be sequentially populated with each received valid solution. Upon reception of a solution, the receiving node may first verify that the received solution is unique, that is, has not already been received, by looking-up in its look-up table for a same solution already stored in the table. Upon determination of a same solution already stored in the table, the receiving node may discard the message, without even checking the validity of the solution received along with the message. Upon determination that no same solution is already stored in the table, the receiving node may proceed with checking the validity of the solution received along with the message. Further operations at the receiving node as described above according to embodiments of the present subject disclosure may then be performed.

Figure 5B:
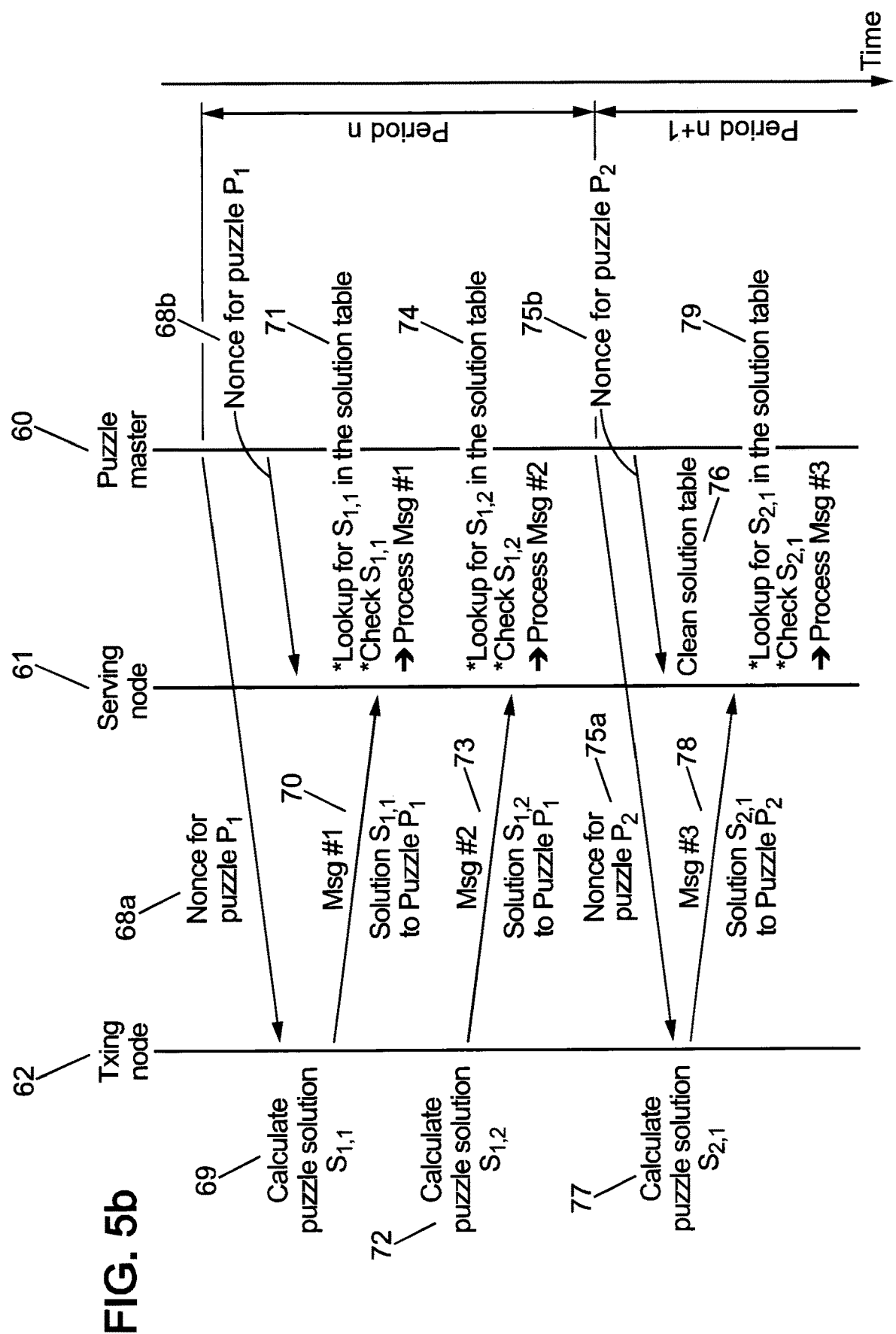
FIG. 5b illustrates an exemplary data communication scheme according to one or more embodiments.

For example, as illustrated on FIG. 5b, a puzzle master (60) may transmit to a transmitting node (62) and to a serving node (61) (receiving node) a NPC message carrying a nonce for a puzzle P1 valid for the period n. The transmitting node (62) may compute (69) a solution (S1,1) to the puzzle P1 received (68a) during the period n from the puzzle master (60), then transmit (70) a message Msg #1 along with (possibly comprising) the solution S1,1 to the puzzle P1, to the serving node (61).

The serving node (61) may be configured for, upon receiving the message Msg #1 and the solution S1,1, looking-up (71) the solution S1,1 in its solution table to check whether or not it has already received the solution S1,1. If the solution S1,1 cannot be found in the solution table, the serving node (61) may check the validity of the solution S1,1 based on the puzzle P1 received (68b) during the period n from the puzzle master (60), and once the solution S1,1 is determined to be valid, process the Msg #1, for example to serve a request included therein.

Meanwhile, during the same period n, the transmitting node (62) may compute (72) another solution (S1,2) to the puzzle P1 received (68a) during the period n from the puzzle master (60), in order to send another message to the serving node (61). The transmitting node (62) may then transmit (73) a message Msg #2 along with (possibly comprising) the solution S1,2 to the puzzle P1, to the serving node (61).

The serving node (61) may be configured for, upon receiving the message Msg #2 and the solution S1,2, looking-up (74) the solution S1,2 in its solution table to check whether or not it has already received the solution S1,2. If the solution S1,2 cannot be found in the solution table, the serving node (61) may check the validity of the solution S1,2 based on the puzzle P1 received (68b) during the period n from the puzzle master (60), and once the solution S1,2 is determined to be valid, process the Msg #2, for example to serve a request included therein.

The following period (n+1) may then be reached, at which point the puzzle master (60) may transmit to the transmitting node (62) and to the serving node (61) (receiving node) a new NPC message carrying a nonce for a puzzle P2 valid for the current period (n+1).

The transmitting node (62), wanting to transmit data to the serving node, may be configured to use the last received puzzle to calculate the puzzle solution that it will transmit along the message to be transmitted to the serving node. The transmitting node (62) may then compute (77) a solution (S2,1) to the puzzle P2 received (75a) for the current period n+1 from the puzzle master (60), in order to send another message to the serving node (61). The transmitting node (62) may then transmit (73) a message Msg #3 along with (possibly comprising) the solution S2,1 to the puzzle P2, to the serving node (61).

The serving node (61) may be configured for, upon receiving the nonce for the puzzle P2, clean its solution table (e.g. flush all puzzle solutions stored in its solution table), so that it manages received puzzle solutions during the new current period (n+1). The serving node (61) may further be configured for, upon receiving the message Msg #3 and the solution S2,1, looking-up (79) the solution S2,1 in its solution table to check whether or not it has already received the solution S2,1. If the solution S2,1 cannot be found in the solution table, the serving node (61) may check the validity of the solution S2,1 based on the puzzle P2 received (75b) during the period n+1 from the puzzle master (60), and once the solution S2,1 is determined to be valid, process the Msg #3, for example to serve a request included therein.

As discussed above, in one or more embodiments, the puzzle to be used by a node of interest (transmitting node and/or receiving node) of the computer network may be formulated with a plurality of parameters, including a nonce parameter obtained by the node of interest according to a puzzle distribution scheme and one or more parameters obtained by the node of interest independently of a puzzle distribution scheme, such as used for distributing the nonce parameter (implicit puzzle parameters).

As another example of implicit puzzle parameter, in some embodiments, a data stream identifier may be used, together with the received nonce, as (implicit) parameter of the puzzle.

The data stream identifier implicit puzzle parameter may advantageously be used in one or more embodiments to reinforce the puzzle resilience to any kind of attack, so that a node cannot "steal" the puzzle solution calculated by another upstream node. The use of a puzzle comprising a stream identifier is particular useful for daisy chain topology networks, where an intermediate corrupted node may steal a puzzle solution corresponding to an incoming message, and send some flooding messages with the stolen puzzle solution.

In embodiments using industrial buses based on Ethernet, the stream identifier used according to the proposed method may comprise the concatenation of layer-2 Ethernet source and destination addresses, and possibly a VLAN tag.

For data streams conveyed by an UDP layer, the stream identifier used according to the proposed method may comprise the concatenation of UDP source address, UDP destination address, UDP source port, and UDP destination port.

Other implicit puzzle parameters, such as for example the time value parameter as described above, may be used in combination with the data stream identifier parameter and the nonce parameter.

For example, in some embodiments where a hash-based puzzle is used that consists in finding a bitstring solution X such that the m least significant bits of the hash value of X concatenated with another bitstring Z provided by the protocol is equal to a predetermined bit stream Y ($LSB_m[H(x|z)]=Y$), the bitstring z may comprise the concatenation of a nonce value (for example corresponding to a transmission time of time synchronization protocol message (e.g. the "Sync" message when the IEEE-1588 protocol is used)), a time value (for example a time cycle sequence number), and a stream identifier. For example, z may be chosen as follows: $z=Time_{sync}|Cycle_{SN}|StreamID$.

In embodiments where the above-stated formula ($LSB_m[H(x|z)]=Y$) is used, the transmitting node must calculate a solution using brute force. The number of tentatives depends on the number of output bits that shall be set to a particular value. For simplicity, the output expected value Y can be chosen as a bitstring of 0. When the system can rely safely on the data stream identifier (i.e. cannot be forged by any node), then the number of bits may depends on the data stream identifier so that the puzzle is more complex for nodes with high computational resource than for lower node. This advantageously flexible method can also be used to define in the network some highly trusted nodes for which the number of required bits can be set to 0.

In embodiments using a hash-based puzzle, the hash function may preferably be chosen so that the resulting output value cannot be predicted. For instance, a Secure hash Algorithm (e.g. of the SHA-2 or SHA-3 families) may be used for implementing the proposed method with hash-based puzzles.

In one or more embodiments, the message used to broadcast nonce-based puzzles may be protected, for instance using authentication schemes. In some embodiments, the NPC message itself may be authenticated to protect against possible fake messages that would allow the attacker to use sets of pre-calculated puzzle solutions.

In addition, to protect against possible packet loss, the nonce values may be identified by an index that is inserted into the puzzle solution. The index may be the current time divided by the NPC message periodicity. The loss of a packet conveying a nonce value can then be easily detected by a node because of the periodicity reflected in the received nonce value. As discussed above in relation with some embodiments, a transmitting node may be configured to use the latest received nonce for the calculation of a puzzle solution. When verifying a puzzle solution, a receiving node may be configured to use the nonce identified by the index inserted in the solution. In some embodiments, if this nonce is not available at the node (because of packet loss), then the puzzle solution may be considered as correct. In other embodiments, if the nonce is not available at the node (because of packet loss), then the puzzle solution may not be considered as correct, and the message associated with the solution may be discarded, as described above.

In embodiments using the IEEE-1588 protocol for time synchronization, the "SequenceId" field may be preferably used as nonce index.

Figure 6:
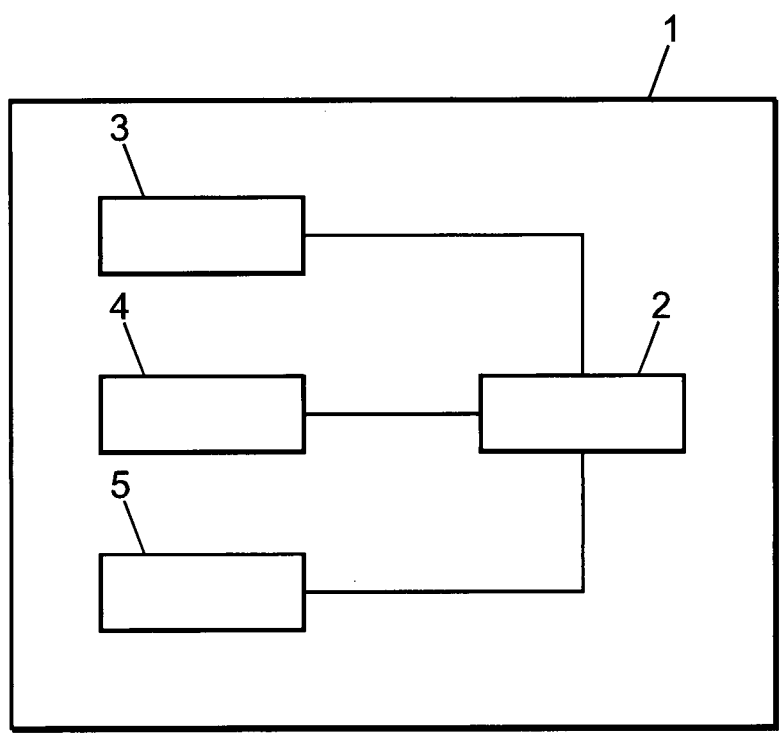
FIG. 6 illustrates an exemplary network node according to one or more embodiments.

FIG. 6 illustrates an exemplary network node 1 configured to use network transmission and/or reception features in accordance with embodiments of the present subject disclosure.

The network node 1 includes a control engine 2, a network management engine 3, a data communication engine 4, a memory 5, and a power supply (e.g., a battery, plug-in power supply, etc.) (not represented on the figure).

In the architecture illustrated on FIG. 6, all of the network management engine 3, data communication engine 4, and memory 5 are operatively coupled with one another through the control engine 2.

In one embodiment, the network management engine 3 is configured to perform various aspects of embodiments of the proposed methods for data transmission and/or data reception as described herein.

In one embodiment, the data communication engine 4 is configured to receive and transmit data packets, and process received packets.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage computer storage medium, capable of storing a data structure representing a computer network to which the network node 1 belongs, coupled to the control engine 2 and operable with the data communication engine 4 and the network management engine 3 to facilitate management and processing of data packets stored in association therewith.

In embodiments of the present subject disclosure, the network node 1 is configured for performing the data transmission and/or data reception methods described herein.

It will be appreciated that the network node 1 shown and described with reference to FIG. 6 is provided by way of example only. Numerous other architectures, operating environments, and configurations are possible. Other embodiments of the node may include fewer or greater number of components, and may incorporate some or all of the functionality described with respect to the network node components shown in FIG. 6. Accordingly, although the control engine 2, network management engine 3, data communication engine 4, and memory 5 are illustrated as part of the network node 1, no restrictions are placed on the location and control of components 2-5. In particular, in other embodiments, components 2-5 may be part of different entities or computing systems.

The proposed puzzle methods can advantageously be used to mitigate DoS attacks in a variety of network communication systems, including systems with the following features: time-synchronized network nodes (e.g. using IEEE1588/PTP), high dataspeed (e.g. gigabit Ethernet) involving the possibility for lightweight devices to transmit.

Advantages of the various embodiments of the proposed method provided herein include the following: support of unidirectional data flows (e.g. Publish-Subscribe communication patterns/multicast streams), possible use with message encryption and authentication, low additional network signaling (light puzzle client protocol), intermediate nodes able to identify and filter flooding messages (upstream filtering), resilient to replay and precalculation; calculation required for puzzle resolution adapted to legitimate nodes, and low-complexity calculation in the receiving node (puzzle verification).

While the invention has been described with respect to preferred embodiments, those skilled in the art will readily appreciate that various changes and/or modifications can be made to the invention without departing from the spirit or scope of the invention as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for transmitting data in a computer network, comprising, at a first node of the network:
receiving a nonce used as a parameter of a computing puzzle from a puzzle server node of the network distinct from the first node;
determining at least one solution to the puzzle using the nonce for transmitting a message to a second node of the network distinct from the puzzle server node; and
transmitting data to the second node, wherein a transmitted data comprises a message and the determined solution to the puzzle,
wherein the nonce comprises a nonce value,
wherein the nonce value is based on a transmission time of the puzzle,
wherein the nonce value is based on timestamp information included in a time synchronization message,
wherein a data stream identifier is used, together with the received nonce, as parameter of the puzzle, and
wherein the data stream identifier is a concatenation of at least a source address and a destination address.

2. The method according to claim 1, wherein a new puzzle is periodically received according to a predefined period.

3. The method according to claim 1, wherein the message comprises the solution to the puzzle.

4. The method according to claim 1, wherein a time value obtained based on time synchronization information in the computer network is used, together with the received nonce, as parameter of the puzzle.

5. A computer processor for a network node in a computer network configured to perform the method according to claim 1.

6. An apparatus comprising a processor, a memory operatively coupled to the processor, and network interfaces to communicate in a computer network, wherein the apparatus is configured to perform the method according to claim 1.

7. A computer program product comprising computer program code tangibly embodied in a non-transitory computer readable medium, said computer program code comprising instructions to, when provided to a computer system and executed, cause said computer to perform the method according to claim 1.

8. A method for receiving data in a computer network, comprising, at a second node of the network:
  receiving a nonce used as a parameter of a computing puzzle from a puzzle server node of the network distinct from the second node;
  receiving data from a first node of the network distinct from the puzzle server node, wherein a received data comprises a message and a solution to the puzzle;
  determining whether a received puzzle solution is valid based on a received nonce; and
  upon determining that the received puzzle solution is valid, processing a request comprised in the received message,
  wherein the nonce comprises a nonce value,
  wherein the nonce value is based on a transmission time of the puzzle,
  wherein the nonce value is based on timestamp information included in a time synchronization message,
  wherein a data stream identifier is used, together with the received nonce, as parameter of the puzzle, and
  wherein the data stream identifier is a concatenation of at least a source address and a destination address.

9. The method according to claim 8, further comprising: upon determining that the received puzzle solution is not valid, discarding the received message.

10. The method according to claim 8, further comprising: determining whether the received puzzle solution was already received from any node of the computer network.

11. The method according to claim 8, wherein the message comprises the solution to the puzzle.

12. The method according to claim 8, wherein a time value obtained based on time synchronization information in the computer network is used, together with the received nonce, as parameter of the puzzle.

13. A computer processor for a network node in a computer network configured to perform the method according to claim 8.

14. An apparatus comprising a processor, a memory operatively coupled to the processor, and network interfaces to communicate in a computer network, wherein the apparatus is configured to perform the method according to claim 8.

15. A computer program product comprising computer program code tangibly embodied in a non-transitory computer readable medium, said computer program code comprising instructions to, when provided to a computer system and executed, cause said computer to perform the method according to claim 8.

* * * * *